Dec. 27, 1966  B. J. WATKINS  3,294,112
REMOTELY OPERABLE FLUID FLOW CONTROL VALVE
Filed July 1, 1963
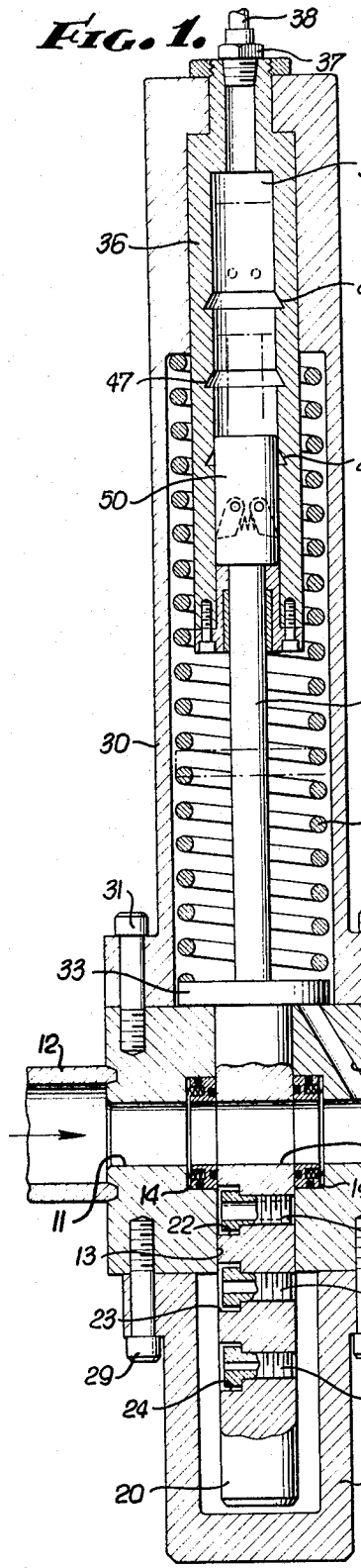
INVENTOR.
BRUCE J. WATKINS
BY
Miketta and Glenny
ATTORNEYS United States Patent Office 3,294,112
Patented Dec. 27, 1966

3,294,112
REMOTELY OPERABLE FLUID FLOW
CONTROL VALVE
Bruce J. Watkins, Palo Verdes Estates, Calif., assignor to Regan Forge & Engineering Co., San Pedro, Calif., a corporation of California
Filed July 1, 1963, Ser. No. 291,725
7 Claims. (Cl. 137—494)

This invention relates in general to a fluid flow control valve that can be used in subsea oil wells and be positively operated from a floating barge or vessel remote from the well. More particularly, this invention relates to a remotely operable fluid flow control valve capable of placing positive sized orifices or beans into a fluid flow line.

In subsea oil well installations, there are many uses for a remotely operable fluid flow control valve to control the flow of fluids to and from the well. In subsea oil wells drilled in particularly deep water, the ability to operate the various well functions from a remote barge or vessel floating on the surface of the water becomes even more important since diving operations may not be possible. One such use of the valve of the present invention is to regulate the flow of oil from a deep subsea well to the surface vessel, the valve normally being installed in the well fluid flow line downstream of the Christmas tree master and wing valves. In prior valves employed to regulate the flow of oil well fluid from the well, a variable orifice has been employed in the main passage through the valve. By varying the size of the orifice, the rate of flow of fluid from the well can be varied and measured as it arrives at the barge or vessel. However, a variable yet positive control over each rate of fluid flow from the well has not been heretofore obtained. None of the prior varying size orifice valves has been capable of selective setting for an exact predetermined size orifice that will allow a predeterminable fluid flow from the well.

It is the principal object of the present invention therefore to disclose and provide a fluid flow control valve adapted for use in a fluid flow line adjacent a well in a subsea installation capable of being remotely operated to present positive sized orifices into the fluid flow line to provide an accurately predeterminable rate of fluid flow through the line.

It is another object of this invention to disclose and provide a fluid flow control valve remotely operable from a floating barge or vessel for controlling fluid flow from a deep subsea oil well by merely back pressuring the existing fluid flow line without the need for provision of additional control lines from the well to the vessel or barge.

It is a further object of this invention to disclose and provide a fluid flow control valve remotely operable from a floating barge or vessel operating the subsea well capable of selectably placing successive orifices or beans of different predetermined size into the fluid flow line and further being capable of being operated remotely to be reset in a starting position ready to again successively present the orifices or beans into the flow line.

It is a still further object of this invention to disclose and provide a remotely operable flow bean for use in fluid lines for positively controlling the rate of fluid flow therethrough from fully open to fully closed by placing positively sized orifices or beans in the line.

It is also an object of this invention to disclose and provide a remotely operable fluid flow control valve having a plurality of orifices or beans successively disposed on a gate means adapted to slidably transverse a main fluid flow passage of the valve and a means of holding the gate means in selected locations with an orifice or bean aligned with the passage but which allows a free return of the gate means to a starting position after it has fully traversed the fluid flow passage.

Generally stated, the present invention contemplates the provision of a main valve body having a main fluid flow passage and a gate receiving passage normal to and intersecting the main passage. The valve body is adapted to be connected into a fluid flow line to place its main passage in fluid communication therewith. Gate means are slidably mounted in the gate receiving passage and arranged to move normal to and through the main passage. A plurality of axially spaced orifices or beans of different size are arranged on the gate means to be successively aligned with the main passage. By selectively placing a fixed size orifice or bean in the main passage of the valve, a predetermined fluid flow can be obtained from the well. Control means for selectively operating the valve to place the various orifices or beans in the main passage are also provided. It is a particular feature of the present invention that the control means are operable by back pressuring the fluid flow line the valve is placed in. Also, the valve may be reset by operating additional means for returning the gate means to a starting position after it has fully traversed the main passage.

Various other objects and advantages of the remotely operable fluid flow control valve according to my invention will be seen and a better understanding of its construction will be obtained from a consideration of the following detailed description of exemplary embodiments thereof. Reference will be made therein to the appended sheet of drawings in which:

FIG. 1 is a longitudinal section taken through an exemplary embodiment of the remotely operable fluid flow control valve in accordance with the present invention showing the exemplary gate means in its starting position;

FIG. 2 is a detail view of an exemplary means for holding the gate means in selectable positions which is employed in the exemplary embodiment of FIG. 1;

FIG. 3 is a cross-sectional view of the exemplary means of FIG. 2 taken therein along the plane III—III;

FIG. 4 is a detail view of the exemplary means of FIGS. 2 and 3 shown in the position it assumes when the gate means has fully traversed the main passage from its starting position of FIG. 2; and FIG. 5 is a longitudinal section of a portion of an alternative exemplary embodiment of the remotely operable fluid flow control valve in accordance with the present invention.

Referring first to FIG. 1, an exemplary embodiment of the remotely operated fluid flow control valve of the present invention is shown connected into the flow stream of a subsea oil well. While the valve is to be mounted normally downstream of the Christmas tree master and wing valves with a direction of flow as shown in FIG. 2, it is not intended to be limited to such location of use.

Valve body 10, in the exemplary embodiments of FIGS. 1 through 5 is provided with a main flow stream passage 11 passing through valve body 10 and being adapted by its size and location therein to be connected into the flow stream of the subsea oil well shown by conduits 12 and 12'. A guide channel 13 is also provided within valve body 10 normal to and intersecting the flow stream passage 11.

Gate means are slidably mounted in the gate receiving passage 13 in valve body 10 to move normal to and through the flow stream passage 11. In the exemplary embodiment of FIG. 1, such gate means comprises the ported gate 20 slidably mounted in the gate receiving passage or channel 13. Ported gate 20 includes a plurality of spaced ports 21, 22, 23, and 24. Positive orifice means or beans 25, 26 and 27 are threadably secured within ports 22, 23 and 24 respectively. Port 21 may be of a predetermined size equilivant to the diameter of the flow stream passage 11 to provide a fully open setting while each of the beans 25, 26 and 27 may be of a different smaller predetermined size. Also, a solid bean may be employed to provide a fully closed position. The ported gate 20 is adapted to slide within channel 13 to successively bring each of the ports 21, 22, 23, and 24 and consequently beans 25, 26 and 27 successively into alignment with the flow passage 11 in order to control the flow of fluids through the flow stream passage 11. Opposed inwardly biased ring seals 14 and 14' are placed on either side of the guide channel 13 co-axial with the flow stream passage 11 to effect a seal between the sliding gate 20 and the passageway 11.

A gate housing 28, as indicated in FIG. 1, may be provided on the bottom of valve 10, as by bolts 29, to contain the bottom end of gate 20 which protrudes below the valve body 10. Housing 28 serves to protect the ported gate 20 from the corrosive environment of sea water which might otherwise have a deteriorating effect upon the beans 25, 26 and 27, as in all conventional gate valves, the interior of housing 28 is in fluid communication, around valve body 10, with the interior of the housing 30 above body 10 to equalize the pressures within the housings acting on the gate.

Gate control means associated with the body 10 and responsive to flow stream back pressure are provided to control the setting of the ported gate 20 relative to the flow stream passage 11. In the exemplary embodiment, such gate control means includes a gate control housing 30, mounted on valve body 10 by a plurality of bolts 31, a fluid passageway 32 in valve body 10 and a fluid pressure responsive means within the housing.

Fluid passageway 32 is provided within the valve body 10 to interconnect the flow stream 11 and the interior of the gate control housing. Passageway 32 is connected into the flow stream passage 11 at a point therein downstream of the guide channel 13 and into the interior of housing 30 at the bottom end thereof.

Fluid pressure responsive means are provided within the gate control housing and associated with the ported gate 20 to move it in response to back pressure in the flow line 12' and flow stream passage 11, downstream of the guide channel 13. In the exemplary embodiment of FIG. 1, such fluid pressure responsive means comprises a piston 33 mounted on an end of gate 20 within the gate control housing 30. Upon the back pressuring of the flow line 12', fluid will flow from the flow stream passage 11 back through passageway 32 into the control housing 30 and gate housing 28 to act against the piston 33 and cause it to move the ported gate 20 upwards in FIG. 1.

Biasing means may be associated with the valve body and gate means to bias the gate into a lowered or fully open position as shown in FIG. 1. In the exemplary embodiment, such biasing means may comprise a spring 40 disposed within the housing 30 to abut upon an inner surface of the piston 33. It may be seen, therefore, that when such biasing means is employed, initial back pressuring of the flow line 12' causing flow of fluid through line 32 to the piston 33 will not cause movement of the ported gate 20 until the strength of spring 40 is overcome. In my experience with the preferred embodiment, the size of rod and spring chosen has required a back pressure of 600 p.s.i. in order to overcome the spring 40 and an additional pressure of 200 p.s.i. to shift the ported gate from the position shown in FIG. 1 upwardly to a position where the first positive orifice or bean 25 is disposed within the flow stream passage 11.

The piston element 33 has an effective pressure area over its bottom area equal to the entire area of the piston. This is so because, as in all conventional gate valves, the fluid pressure within the housing surrounding the gate valve body 10 acts on both ends of the gate. Any fluid pressure within the housing including portions 30 and 28 will act on the bottom of the gate providing piston 30 with an effective bottom pressure surface equal to its entire area. However, the upper surface of piston element 33 has a smaller effective pressure area because the shaft 34 extends upwardly into sleeve 36 and is not exposed to fluid pressure within the housing. A pressure difference between the interior of the housing, including housing portions 30 and 28, and the interior of sleeve 36 will cause upward movement of the piston 33 and shaft 34 against the bias of spring 40. The pressure difference between the interior of the housing and the interior of the sleeve 36 acts over an effective area equal to the cross-sectional area of shaft 34 to produce a force which will overcome the spring bias.

Ratchet means are provided to hold the ported gate means in preselected positions of adjustment wherein the positive orifice means or beans mounted therein are selectively aligned in the passageway 11. In the exemplary embodiment, as shown in detail in FIGS. 2, 3 and 4, such ratchet means for holding the ported gate 20 is shown associated with the upper end of the rod 34 and within the annular sleeve 36 within housing 30. The exemplary ratchet means includes a pair of pivotally mounted opposed dogs 45 adapted to successively engage ledges 46, 47, and 48 respectively within the annular sleeve 36 upon upward movement of rod 34 and ported gate 20 within the housing 30. Spring means 49, are provided between the dogs 45 and 45' biasing them outwardly against inner surfaces of a ratchet sleeve 50. Ratchet sleeve 50 is provided with opposed slots 51 and 51' to allow the dogs 45 and 45' to penetrate through the ratchet sleeve 50 when aligned therewith and to engage the respective ledges within the annular sleeve 36. As shown in FIG. 1, when the ported gate and rode 34 are in the lowered position, providing the maximum opening within the passageway 11, the opposed dogs 45 and 45' are aligned with the slots in the ratchet sleeve ready to engage a ledge upon upward movement of the ported gate 20. Upon such upward movement, as shown in FIG. 3, the dogs 45 and 45' of the ratchet means engage the first set of ledges 46. Bean 25 is then aligned within the passageway 11. A relief of the back pressure of hydraulic fluid through passageway 32 and an increase in the control line hydraulic pressure to the master valve and to chamber 35 will then seat the ported gate 20 in that position. If another of the beans is to be selected, a further application of back pressure through the passageway 32 from the flow stream passage 12' causes further raising of ported gate 20, the opposed dogs 45 and 45' successively engaging each of the additional ledges 47 and 48.

Additional means are provided for returning the gate means to the starting position of FIG. 1. In the exemplary embodiment, as shown in FIG. 2, such means may include a rod 34, sleeve 36 and a hydraulic hose 38 and its fitting 37 adapted to cooperatively urge the gate means into the starting position of FIG. 2 upon increasing the hydraulic pressure in chamber 35. Rod 34 is provided within the housing 30 extending upwardly from the piston 33 into the chamber 35, formed between the annular sleeve 36 positioned in an upper portion of the housing 30 and the rod 34 extending into its interior. As shown in FIG. 1, spring means 40 encompass a portion of sleeve 36. At the top of the chamber 35 there is a port through the sleeve 36 to which fitting 37 and hose 38 are interconnected. The hose or hydraulic line 38 may lead to the hydraulic control line leading to the master valve, which is normally of the fail closed type. The hydraulic fluid pressure in such control line in addition to holding the master valve open, therefore, also is exerted through hydraulic line 38, fitting 37 and chamber 35 against the upper end of rod 34 within the housing 30 to hold piston 33 down, as shown in FIG. 1. With this additional means in the exemplary embodiment, no movement of rod 34 and piston 33, and therefore the ported gate 20, may be effected as long as this hydraulic pressure maintaining the master valve open is in effect. In order to shift the ported gate 20 to provide a selected bean, such as bean 25, in the flow stream passage 11, the hydraulic control line to the master valve is bled down to reduce hydraulic pressure therein. This not only closes the master valve, ending fluid flow through the flow stream 12 into the passageway 11, but also releases hydraulic pressure within chamber 36 being exerted upon the top of the rod 34 and holding ported gate 20 in its fully opened position of FIG. 1. With the master valve closed and pressure relieved from the top end of rod 34, a back pressuring of hydraulic fluid within the flow stream 12' will cause a back flow of hydraulic fluid through the fluid passageway 32 against the piston 33. The ported gate 20 then will move upward in FIG. 1 when the biasing force of spring means 40 is overcome.

In order to reset the gate to the starting position of FIG. 1, sufficient back pressure by the hydraulic fluid from flow stream 12' through passageway 32 is applied to raise the ported gate 20 and rod 34 until the end of the rod abuts the upper interior surface of the chamber 35 within annular sleeve 36, as shown in FIG. 4. The ratchet sleeve 50 is slidably mounted on the upper end of rod 34 and adapted by interior indentations 52 and 53 to engage detent means 54 and 55 respectively on rod 34. In the position of FIG. 3, the lower detent means 54 is shown engaging the lower interior indentation 52 of the ratchet sleeve holding the sleeve in an upper position upon the rod 34 with its slots 51 and 51' aligned with the opposed dogs 45 and 45'. Upon a complete raising of the rod 34 within the chamber 35 within housing 30, the detent means 54 are disengaged from the indentation 52 and ratchet sleeve 50 rides downwardly relative to rod 34 due to its abutment with the upper surface of chamber 35 bringing the upper detent means 55 on rod 34 into engagement with the upper interior indentation 53. In the position of FIG. 4, where the ratchet sleeve 50 is in its lowered position relative to the rod 34, the opposed dogs 45 and 45' are maintained within the ratchet sleeve out of alignment with the slots 51 and 51' within ratchet sleeve 50. Therefore, a reduction of back pressure within the flow stream 12 and an increase in the hydraulic pressure within the control line to open the master valve and to increase the hydraulic pressure within chamber 35 will effect a complete return of the ported gate to its starting position of FIG. 1. The remotely operated flow bean is then in position to be again operated to bring any one of its positive sized orifices or beans 25, 26 or 27 into alignment with the flow stream passage 11.

In FIG. 5, there is shown a portion of an alternative exemplary embodiment of the remotely operable fluid flow control valve of the present invention. Valve body 10 and control housing 30 are the same as those shown in FIG. 1. In this alternative embodiment, the gate receiving housing 128 is ported at its bottom and provided with hydraulic pressuring means for applying hydraulic pressure to the bottom end of the gate means acting contrary to the bias of spring means 40 and the hydraulic pressure in the chamber 35 above the gate means. A rod 60 is provided on the bottom end of the gate means 20 within the housing 128 of the same diameter as rod 34 above the gate means. Rod 60 is packed off by the packing 61 in housing 128 and extends into a pressure housing 62 provided at the bottom of housing 128. A hydraulic hose 63, running from the surface vessel or barge, may be provided communicative with the exterior of pressuring housing 62 by the fitting 64. By applying hydraulic pressure to the rod 60 through hose 63 the hydraulic pressure in the chamber 35 acting against the top of rod 34 may be balanced and even overcome, as well as the bias of spring means 40. Therefore, if it is desired to shift the gate means 20 without shutting the master valve or back pressuring the fluid supply line, sufficient hydraulic pressure applied through line 63 from a remote source can override the forces holding the gate means down in FIG. 1 and move a selectable orifice or bean into the flow line.

From the foregoing, it can be seen that the remotely operable fluid flow control valve of the present invention may be operated from a remote spot, such as a floating barge or vessel over a subsea oil well, to selectively place successive orifices or beans of predetermined size into a fluid flow line. The control over the disposition of the gate means including the various orifices may be accomplished by use of the already present fluid flow line itself by merely applying back pressure through the line. The valve according to the present invention may also be reset to a starting position by the use of the normally employed hydraulic control line to the fail closed master valve. Thus additional control lines to operate and reset the valve are not necessary. In an alternative embodiment, however, an external control is employed to positively operate and control the positioning of the gate means without disturbing the fluid pressure state of either the fluid flow line itself or the hydraulic control line to the master valve.

Having thus described an exemplary and alternative exemplary embodiment of the present invention it should be understood that the invention is described and limited only by the appended claims, all changes or alterations in the exemplary embodiments coming within the scope thereof being embraced thereby.

I claim:

1. A remotely operated flow bean for use in subsea oil wells comprising:

a valve body having a flow stream passage to be interconnected with the flow stream of a subsea oil well and a gate receiving passage normal to and intersecting said flow stream passage;

gate means slidably mounted in said gate receiving passage to move normal to and through said flow stream passage, said gate means including a plurality of individual orifices of different sizes for alignment with said flow stream passage on movement of said gate means to selectively restrict fluid flow through said flow stream passage;

biasing means associated with said body and gate means to bias said gate into an open starting position;

control means associated with said body for moving said gate means against said bias relative to said flow stream passage to selectively align any of said orifices with said flow stream passage to control fluid flow therethrough in response to flow stream back pressure;

ratchet means for holding said gate against said bias in positions selected by operation of said control means with a selected orifice aligned with said flow stream passage; and resetting means for holding said ratchet means inoperative under said bias upon movement of said gate to a fully raised position by application of fluid stream back pressure on said control means and for releasing said ratchet means into operative position on return of said gate to said starting position, said control valve thereby being fully operable from a starting position through selected orifice aligned positions to a fully raised position and reset back to said starting position by the selected application of flow stream back pressure through the single flow line in which said valve body is interconnected and from a location remote from said control valve.

2. A remotely operable self-resetting fluid flow control valve particularly adapted for use in subsea oil well installations to positively control fluid flow to or from the well, comprising:

a valve body having a main passage to be connected into a fluid flow line of a subsea oil well installation and a gate receiving passage normal to and intersecting said main passage;

gate means slidably mounted in said gate receiving passage to move normal to and through said main passage, said gate means including a plurality of axially spaced orifices of different sizes to be individually aligned with said main passage upon movement of said gate means in said gate receiving passage;

biasing means for biasing said gate means into an open starting position wherein one of said axially spaced orifices is aligned with said main passage;

control means associated with said body for moving said gate means from said open starting position to a fully raised closed position relative to said main passage to selectively place each of said different sized orifices into said main passage to positively control fluid flow through said main passage in response to fluid back pressure applied within said fluid flow line; and means for resetting said gate means from said fully raised position into said starting position under the action of said biasing means, said means for resetting being automatically operated by the full raising of said gate means to allow return of said gate means to said open starting position by controlling flow stream back pressure applied to said control means.

3. A remotely operable self-resetting fluid flow control valve as in claim 2 wherein:

ratchet means are associated with said gate means and valve body for holding said gate means in selectable raised positions between said starting position and fully raised position, and said resetting means includes sleeve means for rendering said ratchet means inoperative upon movement of said gate means into said fully raised position to allow return of said gate means to said open starting position.

4. A remotely operable fluid flow control valve as in claim 3 including additional hydraulically actuated means for applying hydraulic pressure against said gate means to urge it toward said open starting position in addition to the bias applied thereto by said biasing means.

5. A remotely operable fluid flow valve comprising:

a valve body having a flow stream passage to be interconnected into a fluid flow line;

gate means having a plurality of spaced orifices, each of a predetermined different size;

means for slidably mounting said gate means within said valve body for sliding movement across said flow stream passage to successively align each said orifice therein, said means for slidably mounting said gate means including biasing means for biasing said gate means into an open starting position; and gate control means associated with said body and said fluid flow line for moving said gate means from said open starting position in response to fluid flow line back pressure to select any of said orifices for restricting fluid flow through said flow line in response to line back pressure;

and resetting means for automatically resetting said gate means to starting position in response to application of and reduction of fluid flow line back pressure.

6. A remotely operable fluid flow valve as in claim 5 wherein:

ratchet means said resetting means includes to hold said gate means against the bias of said biasing means in preselected positions to align any of said orifices selected, in addition to said open starting position for said gate means, upon release of back pressure in said fluid flow line employed to place said gate means in said preselected positions, and said resetting means further including means for holding said ratchet means inoperative are provided for allowing said gate means to be returned to said open starting position by said biasing means, said resetting means being automatically operated by the movement of said gate means into a predetermined position through the application of flow stream back pressure.

7. A remotely operable fluid flow valve as in claim 6 including:

hydraulic means associated with said resetting means including a pressure chamber surrounding an upper portion of said gate means to be associated with a hydraulic control line for urging said gate means toward its starting position by application of hydraulic pressure thereon in addition to said biasing means upon reduction of back pressure within said fluid flow line, the pressure within said pressure chamber surrounding an upper portion of said gate means being increased on an increase of hydraulic pressure within said control line.

References Cited by the Examiner

UNITED STATES PATENTS

| | | | |
|---|---|---|---|
| 458,762 | 9/1891 | Charonnat | 251—206 X |
| 1,485,264 | 2/1924 | Heald | 251—206 |
| 1,540,209 | 6/1925 | Frazier | 138—44 |
| 2,626,633 | 1/1953 | Wilson | 137—467 X |
| 2,780,232 | 2/1957 | Ney | 251—206 X |
| 2,785,698 | 3/1957 | Vance | 137—461 X |
| 2,833,303 | 5/1958 | Leutwiler | 137—495 |

WILLIAM F. O'DEA, *Primary Examiner*

ISADOR WEIL, *Examiner.*

H. WEAKLEY, *Assistant Examiner.*